(12) United States Patent
Ayirala et al.

(10) Patent No.: US 9,464,516 B2
(45) Date of Patent: Oct. 11, 2016

(54) WATER INJECTION SYSTEMS AND METHODS

(75) Inventors: Subhash Chandra Bose Ayirala, Houston, TX (US); Robert Wing-Yu Chin, Katy, TX (US); Andreas Nicholas Matzakos, Missouri City, TX (US); Ernesto Uehara-Nagamine, Houston, TX (US)

(73) Assignee: Shell Oil Company, Houston, TX (US)

( * ) Notice: Subject to any disclaimer, the term of this patent is extended or adjusted under 35 U.S.C. 154(b) by 719 days.

(21) Appl. No.: 13/505,001

(22) PCT Filed: Oct. 29, 2010

(86) PCT No.: PCT/US2010/054617
§ 371 (c)(1),
(2), (4) Date: May 24, 2012

(87) PCT Pub. No.: WO2011/053752
PCT Pub. Date: May 5, 2011

(65) Prior Publication Data
US 2012/0227975 A1    Sep. 13, 2012

Related U.S. Application Data

(60) Provisional application No. 61/257,308, filed on Nov. 2, 2009.

(51) Int. Cl.
| | |
|---|---|
| *E21B 43/40* | (2006.01) |
| *E21B 43/16* | (2006.01) |
| *B01D 61/08* | (2006.01) |
| *E21B 43/20* | (2006.01) |
| *B01D 61/02* | (2006.01) |

(52) U.S. Cl.
CPC ............... *E21B 43/40* (2013.01); *E21B 43/20* (2013.01); *B01D 61/027* (2013.01); *B01D 61/08* (2013.01); *B01D 2311/04* (2013.01); *B01D 2311/2649* (2013.01); *E21B 43/16* (2013.01)

(58) Field of Classification Search
CPC B01D 2311/04; B01D 61/08; B01D 61/022; B01D 2311/2649; B01D 61/027; E21B 43/20; E21B 43/40; C09K 8/528
See application file for complete search history.

(56) References Cited

U.S. PATENT DOCUMENTS

| | | | |
|---|---|---|---|
| 7,093,663 B1 * | 8/2006 | Bader | B01D 61/147 166/279 |
| 7,144,511 B2 | 12/2006 | Vuong | 210/652 |
| 7,455,109 B2 | 11/2008 | Collins | |
| 2003/0230535 A1 | 12/2003 | Affeld et al. | 210/652 |
| 2004/0256116 A1 | 12/2004 | Olsvik et al. | 166/401 |
| 2008/0169098 A1 | 7/2008 | Christopher et al. | |
| 2009/0194272 A1 | 8/2009 | Baillie | 166/90.1 |

(Continued)

FOREIGN PATENT DOCUMENTS

| | | |
|---|---|---|
| CN | 1910116 | 2/2007 |
| CN | 101023242 | 8/2007 |

(Continued)

*Primary Examiner* — Zakiya W Bates (57) ABSTRACT

A system comprising a well drilled into an underground formation comprising hydrocarbons; a production facility at a topside of the well; a water production facility connected to the production facility; wherein the water production facility produces water by passing the water through a first and a second nanofiltration module, and then injects the water 5 into the well.

20 Claims, 5 Drawing Sheets

(56) References Cited

U.S. PATENT DOCUMENTS

2009/0308609 A1  12/2009  Curole et al. ............... 166/275
2010/0243246 A1   9/2010  Ayirala et al. ............. 166/266

FOREIGN PATENT DOCUMENTS

GB       1520877      9/1978   ............ E21B 43/20
WO     2007112254    10/2007

* cited by examiner

WATER INJECTION SYSTEMS AND METHODS

PRIORITY CLAIM

The present application claims priority from PCT/US2010/054617, filed 29 Oct. 2010, which claims priority from U.S. provisional application 61/257,308, filed 2 Nov. 2009.

FIELD OF INVENTION

The present disclosure relates to systems and methods for injecting water into a hydrocarbon bearing formation.

BACKGROUND

Oil accumulated within a subterranean oil-bearing formation is recovered or produced therefrom through wells, called production wells, drilled into the subterranean formation. A large amount of such oil may be left in the subterranean formations if produced only by primary depletion, i.e., where only formation energy is used to recover the oil. Where the initial formation energy is inadequate or has become depleted, supplemental operations, often referred to as secondary, tertiary, enhanced or post-primary recovery operations, may be employed. In some of these operations, a fluid is injected into the formation by pumping it through one or more injection wells drilled into the formation, oil is displaced within and is moved through the formation, and is produced from one or more production wells drilled into the formation. In a particular recovery operation of this sort, seawater, field water or field brine may be employed as the injection fluid and the operation is referred to as a waterflood. The injection water may be referred to as flooding liquid or flooding water as distinguished from the in situ formation, or connate water. Fluids injected later can be referred to as driving fluids. Although water is the most common, injection and drive fluids can include gaseous fluids such as air, steam, carbon dioxide, and the like.

Water may be injected by itself, or as a component of miscible or immiscible displacement fluids. Sea water (for offshore wells) and brine produced from the same or nearby formations and water from rivers and lakes (for onshore wells) may be most commonly used as the water source.

GB Patent Specification Number 1,520,877, filed Oct. 14, 1974, discloses that secondary recovery of oil from a permeable stratum is effected using as a drive fluid water whose ionic compositions and/or ionic concentration has been adjusted in a reverse osmosis desalination plant so that the water is compatible with the stratum and the connate water associated therewith. Seawater is treated by the reverse osmosis desalination plant to remove a major proportion of the divalent or higher valency ions and to have its ionic concentration adjusted either by mixing the filtrate and concentrate in predetermined proportions or by recycling the concentrate from each cycle at a higher feed pressure. Particles having a diameter of at least 1 micron may initially be removed by microfiltration or ultrafiltration apparatus. GB Patent Specification Number 1,520,877 is herein incorporated by reference in its entirety.

U.S. Patent Publication 2003/0230535 discloses a method and well for desalinating saline aquifer water, wherein saline aquifer water flows from a subsurface aquifer layer directly into a downhole aquifer inflow region of a desalinated water production well in which a downhole assembly of one or more desalination and/or purification membranes is arranged, which separate the saline aquifer water into a primary desalinated water stream which is produced through the well to surface and a secondary concentrated brine reject stream, which can be disposed into a subsurface brine disposal zone. U.S. Patent Publication 2003/0230535 is herein incorporated by reference in its entirety.

Co-pending U.S. Patent Publication U.S. 2009/0308609, having attorney docket number TH2869 discloses a system comprising a well drilled into an underground formation; a production facility at a topside of the well; a water production facility connected to the production facility; wherein the water production facility produces water by removing some ions and adding an agent which increases the viscosity of the water and/or increases a hydrocarbon recovery from the formation, and injects the water into the well. Co-pending U.S. Patent Publication US 2009/0308609 is herein incorporated by reference in its entirety.

Co-pending U.S. patent application having Ser. No. 12/425,311, discloses a system comprising a well drilled into an underground formation comprising hydrocarbons; a production facility at a topside of the well; a water production facility connected to the production facility; wherein the water production facility produces water by removing some multivalent ions, then removing some monovalent ions, and then adding back some multivalent ions, and then injects the water into the well. Co-pending U.S. patent application Ser. No. 12/425,311 is herein incorporated by reference in its entirety.

U.S. Pat. No. 7,144,511 discloses a method and apparatus for desalinating seawater utilizing a two stage seawater desalination system, a first stage including at least one high performance nanofiltration membrane to receive seawater feed pressurized by a first stage pump sufficiently and to produce a first permeate, and a second stage including at least one high performance nanofiltration membrane to receive the first permeate pressurized by a second stage pump to between about 200 psi and about 300 psi to produce potable water. U.S. Pat. No. 7,144,511 is herein incorporated by reference in its entirety.

Figure 1:
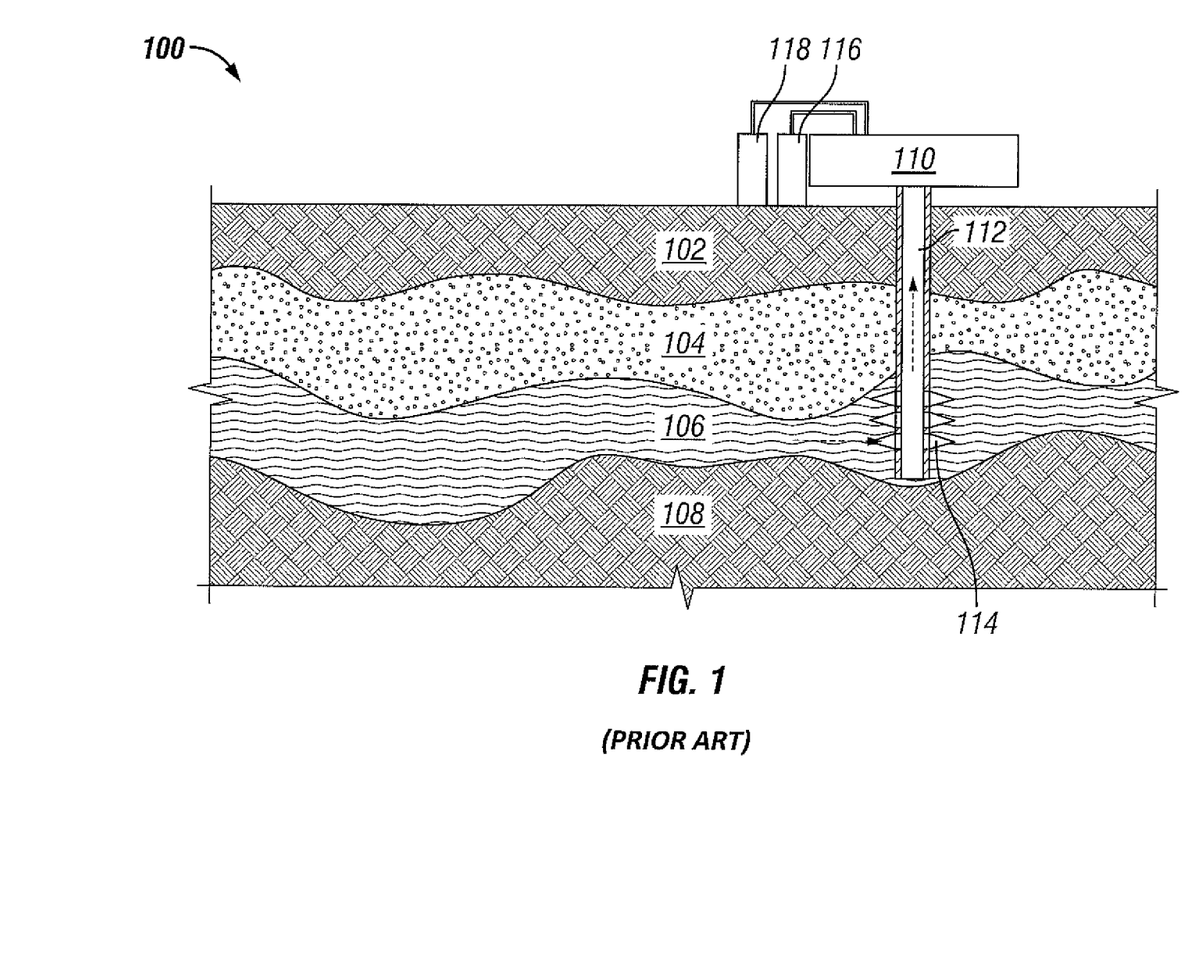
FIG. 1 illustrates a prior art oil and gas production system.

Referring to FIG. 1, there is illustrated prior art system 100. System 100 includes body of water 102, underground formation 104, underground formation 106, and underground formation 108. Production facility 110 may be provided at the surface of body of water 102. Well 112 traverses body of water 102 and formation 104, and has openings in formation 106. A portion of formation 106 may be fractured and/or perforated as shown at 114. Oil and gas may be produced from formation 106 through well 112, to production facility 110. Gas and liquid may be separated from each other, gas may be stored in gas storage 116 and liquid may be stored in liquid storage 118.

There is a need in the art for improved systems and methods for producing oil and/or gas from a subterranean formation. In particular, there is a need in the art for systems and methods for providing an improved water flood.

SUMMARY OF THE INVENTION

One aspect of the invention provides a system comprising a well drilled into an underground formation comprising hydrocarbons; a production facility at a topside of the well; a water production facility connected to the production facility; wherein the water production facility produces water by passing the water through a first and a second nanofiltration module, and then injects the water into the well.

One aspect of the invention provides a method comprising subjecting input water to a first nanofiltration process; then subjecting the water to a second nanofiltration process to produce processed water; and injecting the processed water into an underground formation.

DETAILED DESCRIPTION OF THE INVENTION

Figure 2:
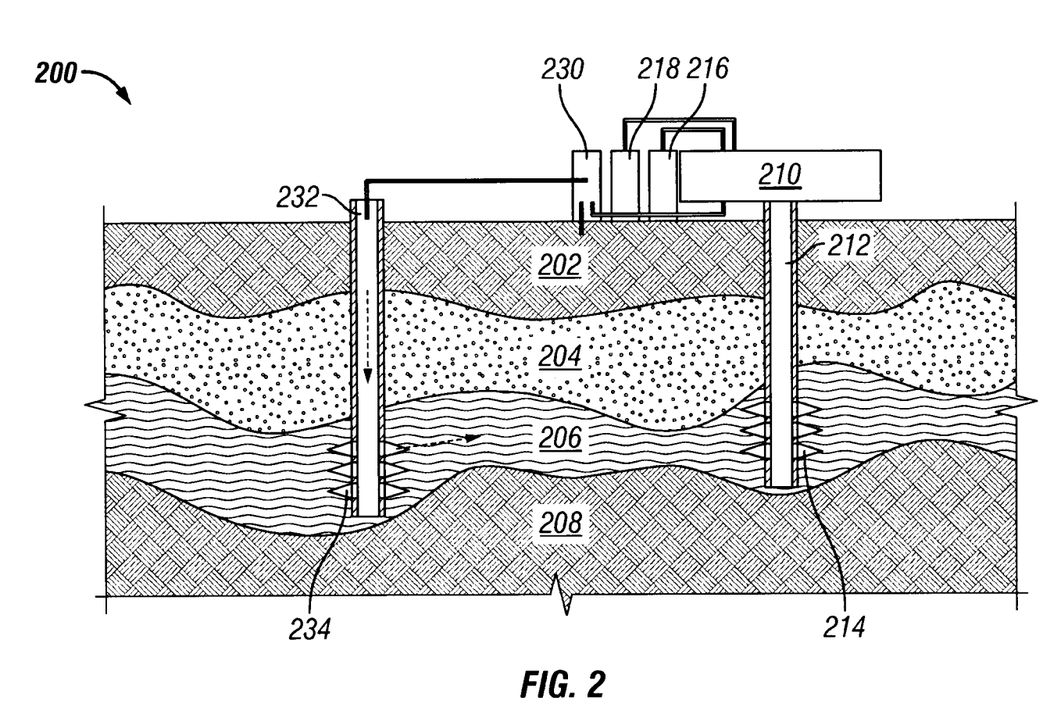
FIG. 2 illustrates an oil and gas production system.

FIG. 2:

Referring now to FIG. 2, in one embodiment of the invention, system 200 is illustrated. System 200 includes body of water 202, formation 204, formation 206, and formation 208. Production facility 210 may be provided at the surface of body of water 202. Well 212 traverses body of water 202 and formation 204, and has openings at formation 206. Portions of formation may be fractured and/or perforated as shown at 214. As oil and gas is produced from formation 206 it enters portions 214, and travels up well 212 to production facility 210. Gas and liquid may be separated, and gas may be sent to gas storage 216, and liquid may be sent to liquid storage 218, and water may be sent to water production 230. Production facility 210 is able to process water, for example from body of water 202 and/or well 212, which may be processed and stored in water production 230. Water from well 212 may be sent to water production 230. Processed water may be pumped down well 232, to fractured portions 234 of formation 206. Water traverses formation 206 to aid in the production of oil and gas, and then the water the oil and gas may be all produced to well 212, to production facility 210. Water may then be recycled, for example by returning water to water production 230, where it may be processed, then re-injected into well 232.

Hydrocarbons, such as oil and/or gas, may be recovered from the earth's subsurface formation 206 through production wellbore 212 that penetrate hydrocarbon-bearing formations or reservoirs. Perforations may be made from the production wellbore 206 to portions of the formation 214 to facilitate flow of the hydrocarbons from the hydrocarbon-bearing formations to the production wellbore. Water may be injected under pressure into injection zones 234 formed in the subsurface formation 206 to stimulate hydrocarbon production through the production wells in a field. Water may be injected by itself as a component of miscible or immiscible displacement fluids. Sea water (for offshore and/or near onshore wells) and brine produced from the same or nearby formations (for offshore and/or onshore wells) may be used as the water source. Such water may contain amounts (concentration) of precursor ions, such as divalent sulfate ($SO_4$=), which may form insoluble salts when they come in contact with cations, such as $Ba^{++}$, $Sr^{++}$ and $Ca^{++}$, resident in the formations. The resulting salts ($BaSO_4$, $SrSO_4$ and $CaSO_4$) can be relatively insoluble at subsurface formation temperature and pressure. Such salts may precipitate out of the solution. The precipitation of the insoluble salts may accumulate and consequently plug the subsurface fluid passageways. The plugging effects may be most severe in passageways in the formation near the injection well 232 and at the perforations of the production well 212. Solubility of the insoluble salts may further decrease as the injection water is produced to the surface through the production well 212, due to the reduction of the temperature and pressure as the fluids move to the surface through the production well. Subsurface or formation fluid passageways may include pores in the formation matrix, fractures, voids, cavities, vugs, perforations and fluid passages through the wells, including cased and uncased wells, tubings and other fluid paths in the wells. Precipitates may include insoluble salts, crystals or scale. Plugging may include reduction in the porosity and/or permeability of fluid passageways and the tubulars used in producing the well fluids and processing of those fluids. Injection water may include any fluid containing water that is injected into a subsurface formation to facilitate recovery of hydrocarbons from subsurface formations.

One purpose of injection well 232 is to aid the flow of hydrocarbons from the reservoir to production well 212. One method is to inject water under pressure adjacent to a production zone to cause the hydrocarbons trapped in the formation 206 to move toward the production well 212.

Figure 3A:
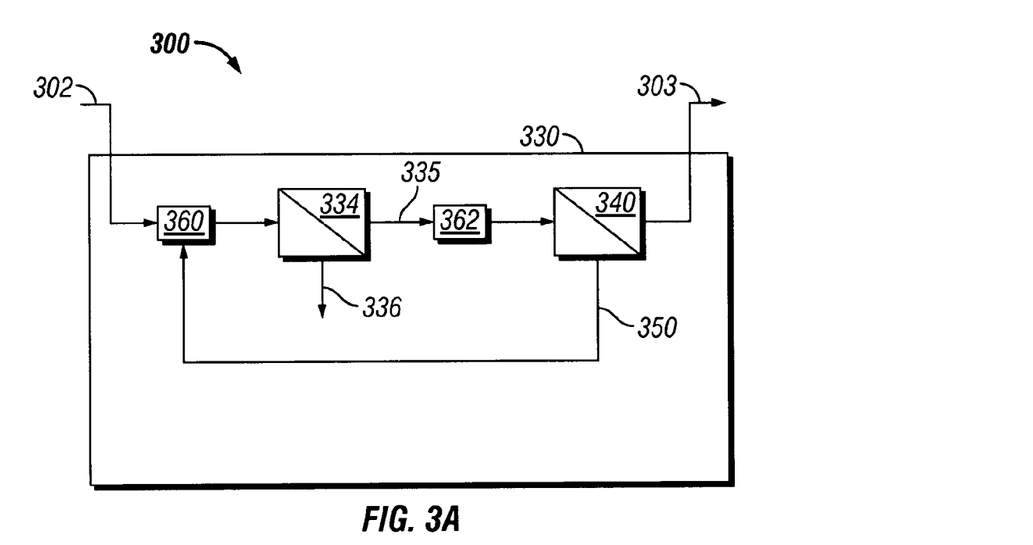
FIG. 3 illustrates a water processing system.

FIG. 3a:

Referring now to FIG. 3a, in some embodiments of the invention, a system 300 for water production 330 is illustrated. Water production 330 has an input 302 of unprocessed water, for example water from a body of water, from a well, seawater, city water supply, or another water supply. At 334, a nanofiltration membrane is provided to produce permeate stream 335 and reject stream 336. Reject stream 336 may be disposed of, subject to further processing, and/or recycled. Permeate stream 335 is then fed to nanofiltration membrane 340 to produce permeate stream 303 and reject stream 350. Reject stream 350 may be disposed of, subject to further processing, and/or recycled. One or more pumps 360 and 362 may be provided to boost the pressure of one or more of the water streams.

Permeate stream 303 may then be used in an enhanced oil recovery operation by injecting permeate stream 303 into a hydrocarbon containing reservoir by itself, or in a mixture with other EOR agents such as polymers, surfactants, solvents, gases, or other EOR agents as are known in the art.

In some embodiments, nanofiltration membrane 334 may be an open pore, less selective nanofiltration membrane. In some embodiments, nanofiltration membrane 334 may have a sodium rejection rate at 25 bars pressure and 70 degrees F. from about 30% to about 50% sodium rejection, for example from about 35% to about 45%, or from about 38% to about 42%. One suitable nanofiltration membrane 334 is commercially available from Dow with model name Dow NF 270.

In some embodiments, nanofiltration membrane 340 may be a closed pore, more selective nanofiltration membrane. In some embodiments, nanofiltration membrane 340 may have a sodium rejection rate at 25 bars pressure and 70 degrees F. from about 70% to about 98% sodium rejection, for example from about 75% to about 97%, or from about 80% to about 96%, or from about 85% to about 95%. One suitable nanofiltration membrane 340 is commercially available from Dow with model name Dow NF 90.

In some embodiments, all the water streams may have a temperature in the range from about 50 to about 100 degrees F., for example from about 60 to about 90 degrees F. Stream 303 may be heated and/or converted to stream prior to being injected into the reservoir.

In some embodiments, permeate stream 303 may have a total dissolved solids (TDS) value from about 1000 to about 10,000 parts per million (ppm), for example from about 1200 to about 5000 ppm, or from about 1500 to about 2000 ppm.

In some embodiments, input water 302 may have a TDS from about 20,000 to about 60,000 ppm, for example from about 30,000 to about 50,000 ppm TDS, or from about 35,000 to about 40,000 ppm TDS.

In some embodiments, permeate stream 335 may have a TDS from about 5,000 to about 30,000 ppm, for example from about 10,000 to about 25,000 ppm TDS, or from about 15,000 to about 20,000 ppm TDS.

In some embodiments, reject stream 336 may have a TDS from about 30,000 to about 90,000 ppm, for example from about 40,000 to about 80,000 ppm TDS, or from about 50,000 to about 70,000 ppm TDS. In some embodiments, reject stream 350 may have a TDS from about 20,000 to about 60,000 ppm, for example from about 30,000 to about 50,000 ppm TDS, or from about 35,000 to about 40,000 ppm TDS.

In some embodiments, pump 360 output to nanofiltration membrane 334 may be a pressure from about 10 to about 70 bars, for example from about 15 to about 40 bars, or from about 20 to about 30 bars.

In some embodiments, pump 362 output to nanofiltration membrane 340 may be a pressure from about 10 to about 70 bars, for example from about 15 to about 40 bars, or from about 20 to about 30 bars.

In some embodiments, permeate stream 335 may be from about 30% to about 80% of the total flow fed to nanofiltration membrane 334, for example from about 40% to about 60%.

In some embodiments, permeate stream 303 may be from about 30% to about 80% of the total flow fed to nanofiltration membrane 340, for example from about 40% to about 60%.

Figure 3B:
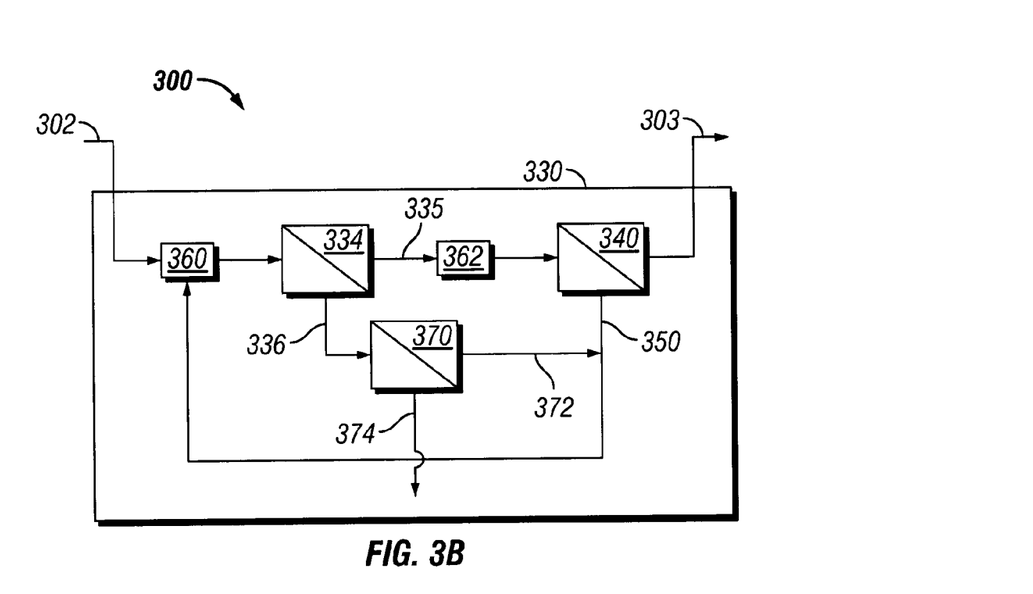

FIG. 3b:

Referring now to FIG. 3b, in some embodiments of the invention, the system 300 of FIG. 3a has been modified by the addition of an additional nano filter 370. Water production 330 has an input 302 of unprocessed water, for example water from a body of water, from a well, seawater, city water supply, or another water supply. At 334, a nanofiltration membrane is provided to produce permeate stream 335 and reject stream 336. Reject stream 336 may be disposed of, subject to further processing, and/or recycled. Permeate stream 335 is then fed to nanofiltration membrane 340 to produce permeate stream 303 and reject stream 350. Reject stream 350 may be disposed of, subject to further processing, and/or recycled.

As shown in FIG. 3b, reject stream 336 is fed to nanofiltration membrane 370 to produce permeate stream 372 and reject stream 374. Reject stream 374 is disposed of. Permeate stream 372 is mixed with reject stream 350 and recycled to be inputted to nanofiltration membrane 334.

One or more pumps 360 and 362 may be provided to boost the pressure of one or more of the water streams.

Permeate stream 303 may then be used in an enhanced oil recovery operation by injecting permeate stream 303 into a hydrocarbon containing reservoir by itself, or in a mixture with other EOR agents such as polymers, surfactants, solvents, gases, or other EOR agents as are known in the art.

In some embodiments, nanofiltration membranes 334 and 370 may be open pore, less selective nanofiltration membranes. In some embodiments, nanofiltration membranes 334 and 370 may have a sodium rejection rate at 25 bars pressure and 70 degrees F. from about 30% to about 50% sodium rejection, for example from about 35% to about 45%, or from about 38% to about 42%. One suitable nanofiltration membrane 334 and 370 is commercially available from Dow with model name Dow NF 270.

In some embodiments, nanofiltration membrane 340 may be a closed pore, more selective nanofiltration membrane. In some embodiments, nanofiltration membrane 340 may have a sodium rejection rate at 25 bars pressure and 70 degrees F. from about 70% to about 98% sodium rejection, for example from about 75% to about 97%, or from about 80% to about 96%, or from about 85% to about 95%. One suitable nanofiltration membrane 340 is commercially available from Dow with model name Dow NF 90.

Figure 3C:
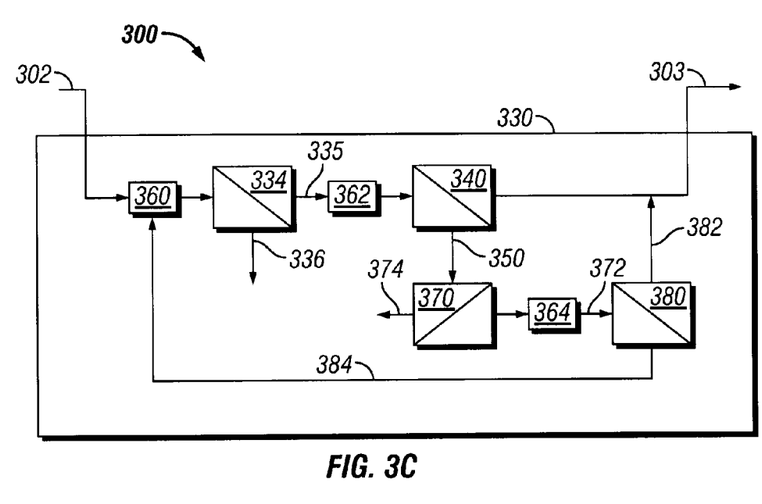

FIG. 3c:

Referring now to FIG. 3c, in some embodiments of the invention, the system 300 of FIG. 3a has been modified by the addition of two additional nano filters 370, 380. Water production 330 has an input 302 of unprocessed water, for example water from a body of water, from a well, seawater, city water supply, or another water supply. At 334, a nanofiltration membrane is provided to produce permeate stream 335 and reject stream 336. Reject stream 336 may be disposed of, subject to further processing, and/or recycled. Permeate stream 335 is then fed to nanofiltration membrane 340 to produce permeate stream 303 and reject stream 350. Reject stream 350 may be disposed of, subject to further processing, and/or recycled.

As shown in FIG. 3c, reject stream 350 is fed to nanofiltration membrane 370 to produce permeate stream 372 and reject stream 374. Reject stream 374 is disposed of. Permeate stream 372 is fed to nanofiltration membrane 380 to produce permeate stream 382 and reject stream 384. Reject stream 384 is recycled to be inputted to nanofiltration membrane 334. Permeate stream 382 is mixed with product stream 303 to be used in an EOR process.

One or more pumps 360, 364 and 362 may be provided to boost the pressure of one or more of the water streams.

Permeate streams 303 and 382 may then be used in an enhanced oil recovery operation by injecting permeate streams 303 and 382 into a hydrocarbon containing reservoir by itself, or in a mixture with other EOR agents such as polymers, surfactants, solvents, gases, or other EOR agents as are known in the art.

In some embodiments, nanofiltration membranes 334 and 370 may be open pore, less selective nanofiltration membranes. In some embodiments, nanofiltration membranes 334 and 370 may have a sodium rejection rate at 25 bars pressure and 70 degrees F. from about 30% to about 50% sodium rejection, for example from about 35% to about 45%, or from about 38% to about 42%. One suitable nanofiltration membrane 334 and 370 is commercially available from Dow with model name Dow NF 270.

In some embodiments, nanofiltration membranes 340 and 380 may be a closed pore, more selective nanofiltration membrane. In some embodiments, nanofiltration membranes 340 and 380 may have a sodium rejection rate at 25 bars pressure and 70 degrees F. from about 70% to about 98% sodium rejection, for example from about 75% to about 97%, or from about 80% to about 96%, or from about 85% to about 95%. One suitable nanofiltration membrane 340 and 380 is commercially available from Dow with model name Dow NF 90.

Figure 4:
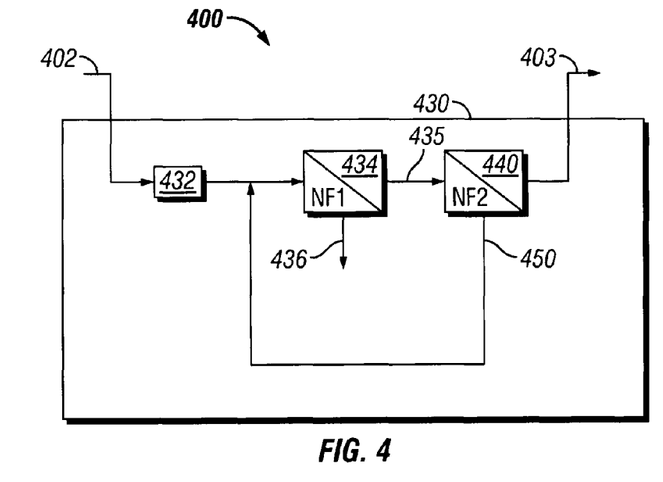
FIG. 4 illustrates a water processing system.

FIG. 4:

Referring now to FIG. 4, in some embodiments of the invention, system 400 for water production 430 is illustrated. Water production 430 has an input of unprocessed water 402, for example water from the body of water from a well, an underground formation, sea water, sewage treatment plant, city water supply, or another water supply. At 432, primary filtration may be accomplished to remove solids from water. At 434, a nanofiltration membrane 434 is provided which produces reject stream 436 which is disposed of and permeate stream 435.

Permeate stream 435 is fed to nanofiltration membrane 440 is provided which produces reject stream 450 which is recycled to nanofiltration membrane 434, and permeate stream 403 which is used in an EOR process.

In some embodiments, system 400 may include unprocessed water 402, from an aqueous feed source such as seawater from the ocean, or any saline water source having some divalent and monovalent ions, such as produced water from a well. As one example, raw seawater may be taken from the ocean, either from a sea well or from an open intake, and initially subjected to primary filtration 432 using a large particle strainer (not shown), and/or multi-media filters, which might be typically sand and/or anthracite coal, optionally followed by a cartridge filtration.

In some embodiments, processes 434 and/or 440 can include one or a plurality of NF cartridges. NF cartridges may be spirally wound semipermeable membrane cartridges, or cartridges made using hollow fiber technology having suitable membrane characteristics. A spirally wound semipermeable membrane cartridge may include a plurality of leaves which are individual envelopes of sheet-like semipermeable membrane material that sandwich therebetween a layer of porous permeate carrying material, such as polyester fibrous sheet material. The semipermeable membrane material may be any of those commercially available materials. Interleaved between adjacent leaves may be lengths of spacer material, which may be woven or other open mesh, screen-like crosswise designs of synthetic filaments, e.g. cross-extruded filaments of polypropylene or the like such as those sold under the trade names Vexar and Nalle, that provide flow passageways for the feed water being pumped from end to end through a pressure vessel. A lay-up of such alternating leaves and spacer sheets may then be spirally wound about a hollow tube having a porous sidewall to create a right circular cylindrical cartridge.

One spirally wound separation cartridge is disclosed in U.S. Pat. No. 4,842,736, the disclosure of which is incorporated herein by reference, which provides a plurality of spiral feed passageways which extend axially from end to end of the ultimate cartridge, through which passageways the feed liquid being treated flows in an axial direction. Internally within the membrane envelopes, the permeating liquid flows along a spiral path inward in a carrier material until it reaches the porous central tube where it collects and through which it then flows axially to the outlet.

In some embodiments, NF cartridges may be selected so as to accomplish the desired overall function of producing a stream of processed water having the desired ionic concentrations from seawater or the like.

NF membranes may be employed which are designed to selectively reject divalent or larger ions, and the NF elements or cartridges which are used may reject a minimum of about 80%, for example more than about 90%, or about 95%, or about 98% of the divalent or larger ions in an aqueous feed. The NF membrane may also at least moderately reduces the monovalent ion content, for example less than about 70%, or less than about 50%, or less than about 30%, or less than about 20% of the monovalent ion content. Suitable commercially available NF membranes can be purchased either in sheet form or in finished spirally wound cartridges, and include those sold as Seasoft 8040DK, 8040DL, and Sesal DS-5 by Osmonics; as NF200 Series and NF-400, NF-270, SR-90 and as NF-90 by Dow-FilmTec; as DS-5DK and DS-5DL by Desalination Systems, Inc., as LES-90, PVD-1 by Hydranautics; as NE-70 and NE-90 by CSM; as NF-300 and NF-500 by Permionics and as TFCS by Fluid Systems, Inc.

In some embodiments, a mechanical method, such as passing the unprocessed water 402 through a nano-filtration membrane, may be used to remove ions from the water at the surface before injecting it into the wellbore and/or adding an agent 440. Sea water may contain from about 2700 to about 3000 ppm of divalent $SO_4=$. The nano-filtration membrane process 434 may reduce this concentration to about 20 to about 150 ppm. A 99% reduction in sulfate content may be achievable.

In some embodiments, chemicals and/or additives may be injected into the untreated water 402 to inhibit the in-situ growth of crystals from insoluble salt precipitation. A variety of additives are injected into the injection water at the surface or directly into an injection well. Production wells may also often be treated with back-flow of fresh brine containing additives to prevent plugging of the passageways.

Microfiltration (MF), ultrafiltration (UF), nanofiltration (NF), and reverse osmosis (RO) are all pressure-driven separation processes allowing a broad range of neutral or ionic molecules to be removed from fluids. Microfiltration may be used for removal of suspended particles greater than about 0.1 microns. Ultrafiltration may be used to exclude dissolved molecules greater than about 5,000 molecular weight. Nanofiltration membranes may be used for passing at least some salts but having high rejection of organic compounds having molecular weights greater than approximately 200 Daltons. Reverse osmosis membranes may be used for high rejection of almost all species.

In some embodiments, a spiral-wound filter cartridge may be used to incorporate large amounts of NF membrane into a small volume. Such an element can be made by wrapping feed spacer sheets, membrane sheets, and permeate spacer sheets around a perforated permeate tube.

In some embodiments of the invention, processed water 303 and/or 403 may be combined with one or more of the aromatics, for example, benzene, toluene, or xylene; turpentine; tetralin; chlorinated hydrocarbons, for example, carbon tetrachloride or methylene chloride; or other hydrocarbons, for example $C_5$-$C_{10}$ hydrocarbons and/or alcohols; ethers, such as dimethyl ether or diethyl ether; steam; or sulfur compounds, for example, hydrogen sulfide, and then injected into a formation for enhanced oil recovery. For example, a mixture of processed water with an agent for increasing the viscosity mixed with alcohol, may be injected into a formation. Low salinity water may also increase the solubility of solvents (like DME and CO2) in water. This will allow more solvent dosing per volume of water.

The reduction of the monovalent and/or divalent cation level of an injection water may achieve one or more of the following benefits:

When oil is attached to the clay surface by the bridging of calcium to the clay and the oil drop, the addition of low salinity water may cause the calcium to diffuse into the bulk solution and liberate the oil droplet;

When oil is attached to the clay surface by the bridging of calcium to the clay and the oil drop, the addition of low salinity water may cause another ion to replace the calcium bonded to the clay, and liberate the oil droplet attached to the calcium by multivalent ion exchange;

The addition of low salinity water may cause a oil wet reservoir to convert into a water wet reservoir and release the oil;
  Increased oil recovery for a reservoir; and
  Increased oil recovery for a high salinity reservoir.
The addition of multivalent cations to an injection water may achieve one or more of the following benefits:
  Reduced clay swelling;
  Increased oil recovery for a reservoir; and
  Increased oil recovery for a high salinity reservoir.

Water may be commonly injected into subterranean hydrocarbon-bearing formations by itself or as a component of miscible or immiscible displacement fluids to recover hydrocarbons therefrom. Unprocessed water 302 and/or 402 can be obtained from a number of sources including brine produced from the same formation, brine produced from remote formations, or sea water. All of these waters may have a high ionic content relative to fresh water. Some ions present in unprocessed water 302 and/or 402 can benefit hydrocarbon production, for example, certain combinations and concentrations of cations and anions, including $K^+$, $Na^+$, $Cl^-$, $Br^-$, and/or $OH^-$, can stabilize clay to varying degrees in a formation susceptible to clay damage from swelling or particle migration. Other ions (or the same ions that benefit hydrocarbon production) present in the unprocessed water 302 and/or 402 can produce harmful effects in situ, for example, divalent $SO_4^=$ anions in the injection water may be particularly problematic because $SO_4^=$ may form salts with cations already present in the formation, such as $Ba^{++}$. The resulting salts can be relatively insoluble at the formation temperatures and pressures. Consequently they may precipitate out of solution in situ. Solubility of the salts further decreases as the injection water may be produced to the surface with the hydrocarbons because of pressure and temperature decreases in the production well. The precipitates of the insoluble salts may accumulate in subterranean fluid passageways as crystalline structures, which ultimately plug the passageways and reduce hydrocarbon production. The effects of plugging may be most severe in passageways located in the formation near wellbores and in production wells where it may be more difficult for the produced fluids to circumvent blocked passageways. Removal of divalent $SO_4^=$ anions from injection water could also reduce the nutrient available for the growth of sulfate reducing bacteria in subsurface environments to effectively mitigate reservoir souring.

In some embodiments of the invention, processed water or a processed water mixture 303 and/or 403 may be injected into formation 206, produced from the formation 206, and then recovered from the oil and gas, for example, by a centrifuge or gravity separator or vibrated nanofilter (VSEP™) or ceramic membrane (like Membralox™), and then processing the water at water production 230, then the processed water or a processed water mixture 303 and/or 403 may be re-injected into the formation 206.

In some embodiments of the invention, processed water or a processed water mixture 303 and/or 403 may be injected into an oil-bearing formation 206, optionally preceded by and/or followed by a flush, such as with seawater, a surfactant solution, a hydrocarbon fluid, a brine solution, or fresh water.

In some embodiments of the invention, processed water or a processed water mixture 303 and/or 403 may be used to improve oil recovery. The processed water or a processed water mixture 303 and/or 403 may be utilized to drive or push the now oil bearing flood out of the reservoir, thereby "sweeping" crude oil out of the reservoir. Oil may be recovered at production well 212 spaced apart from injection well 232 as processed water or a processed water mixture 303 and/or 403 pushes the oil out of the pores in formation 206 and to the production well 212. Once the oil/drive fluid reaches the surface, it may be put into holding tanks 218, allowing the oil to separate from the water through the natural forces of gravity.

The amount of oil recovered may be measured as a function of the original oil in place (OOIP). The amount of oil recovered may be greater than about 5% by weight of the original oil in place, for example 10% or greater by weight of the original oil in place, or 15% or greater by weight of the original oil in place.

The process and system may be useful for the displacement recovery of petroleum from oil-bearing formations. Such recovery encompasses methods in which the oil may be removed from an oil-bearing formation through the action of a displacement fluid or a gas.

Other uses for the processed water or a processed water mixture 303 and/or 403 prepared by the process and system of the invention include near wellbore injection treatments, and injection along interiors of pipelines to promote pipelining of high viscosity crude oil. The processed water or a processed water mixture 303 and/or 403 can also be used as hydraulic fracture fluid additives, fluid diversion chemicals, and loss circulation additives, to mention a few.

EXAMPLES

Figure 5:
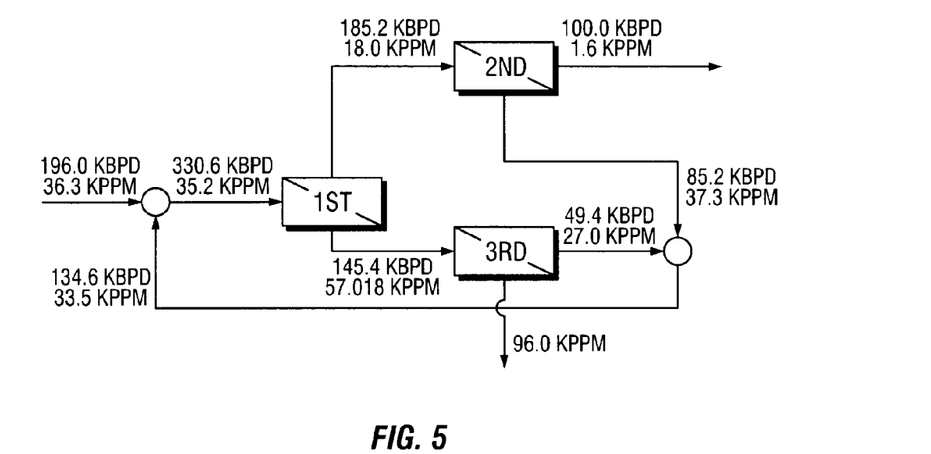
FIG. 5 illustrates a three module nanofiltration system.

Case 1:
A three module nanofiltration system was modeled as shown in FIG. 5. The top number in the schematic is the flow rate in thousands of barrels per day, and the bottom number is the TDS in thousands of PPM.

|  | Feed | Reject | Permeate | Fresh Feed |
|---|---|---|---|---|
| 1st NF |  |  |  |  |
| Recovery | 56% | 1610 | 1366 | 51.0% |
| Flow, kbpd | 330.6 | 145.4 | 185.2 | 196.0 |
| TDS, thousand ppm | 35.176 | 57.018 | 18.021 | 36.3 |
| 2nd NF (from 1st permeate) |  |  |  |  |
| Recovery | 54% | 840 | 1188 |  |
| Flow, kbpd | 185.1691 | 85.2 | 100.0 |  |
| TDS, thousand ppm | 18.021 | 37.340 | 1.565 | 91% |
| 3rd NF (from 1st reject) |  |  |  |  |
| Recovery | 34% | 490 | 300 |  |
| Flow, kbpd | 145.4309 | 96.0 | 49.4 |  |
| TDS, thousand ppm | 57.018 | 72.479 | 27.005 |  |
| Recycle Ratio | 0.69 |  |  |  |
| Power Consumption | 28.54 | kW/kbpd |  |  |
| # Elements | 29.4 | #/kbpd |  |  |

Figure 6:
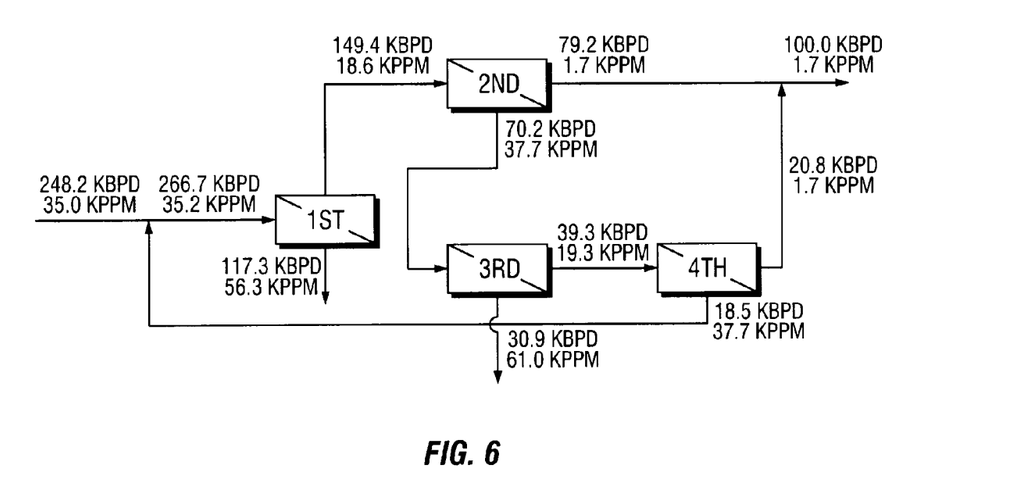
FIG. 6 illustrates a four module nanofiltration system.

Case 2:
A four module nanofiltration system was modeled as shown in FIG. 6. The top number in the schematic is the flow rate in thousands of barrels per day, and the bottom number is the TDS in thousands of PPM.

|  | Feed | Reject | Permeate | Fresh Feed |
|---|---|---|---|---|
| 1st NF |  |  |  |  |
| Recovery | 56% | 1400 | 1313 | 40.3% |
| Flow, kbpd | 266.7 | 117.3 | 149.4 | 248.2 |

-continued

|  | Feed | Reject | Permeate | Fresh Feed |
|---|---|---|---|---|
| TDS, thousand ppm 2nd NF (from 1st permeate) | 35.176 | 56.314 | 18.574 | 35.0 |
| Recovery | 53% | 700 | 957 |  |
| Flow, kbpd | 149.4 | 70.2 | 79.2 |  |
| TDS, thousand ppm 3rd NF (from 2nd reject) | 18.574 | 37.654 | 1.655 | 91% |
| Recovery | 56% | 350 | 51 |  |
| Flow, kbpd | 70.2 | 30.9 | 39.3 |  |
| TDS, thousand ppm | 37.654 | 61.026 | 19.290 |  |
| Recycle Ratio | 0.07 |  |  |  |
| Power Consumption | 25.89 | kW/kbpd |  |  |
| # Elements | 26.2 | #/kbpd |  |  |

Illustrative Embodiments:

In one embodiment, there is disclosed a system comprising a well drilled into an underground formation comprising hydrocarbons; a production facility at a topside of the well; a water production facility connected to the production facility; wherein the water production facility produces water by passing the water through a first and a second nanofiltration module, and then injects the water into the well. In one embodiment, there is disclosed a system comprising a first well drilled into an underground formation comprising hydrocarbons; a production facility at a topside of a first well; a water production facility connected to the production facility; a second well drilled into the underground formation; wherein the water production facility produces water by passing the water through a first and a second nanofiltration module, and injects the water into the second well and into the underground formation. In some embodiments, the first well is a distance of 50 meters to 2000 meters from the second well. In some embodiments, the underground formation is beneath a body of water. In some embodiments, the production facility is floating on a body of water, such as a production platform. In some embodiments, the system also includes a water supply and a water pumping apparatus, adapted to pump water to the water production facility. In some embodiments, the water production facility has an input water having a total dissolved salts value of at least 15,000 parts per million, expressed as sodium chloride dissolved. In some embodiments, the system also includes subjecting a reject stream from at least one of the first and the second nanofiltration modules to a recycle step. In some embodiments, the system also includes subjecting a reject stream from at least one of the first and the second nanofiltration modules to a third nanofiltration module. In some embodiments, the first nanofiltration module comprises a sodium rejection rate at 25 bars from 30 to 50%. In some embodiments, the second nanofiltration module comprises a sodium rejection rate at 25 bars from 70% to 98%. In some embodiments, the first well is a distance of 50 meters to 2000 meters from the second well. In some embodiments, the underground formation is beneath a body of water. In some embodiments, the production facility is floating on a body of water, such as a production platform. In some embodiments, the system also includes a water supply and a water pumping apparatus, adapted to pump water to the water production facility. In some embodiments, the water production facility has an input water having a total dissolved salts value of at least 15,000 parts per million, expressed as sodium chloride dissolved.

In one embodiment, there is disclosed a method comprising subjecting input water to a first nanofiltration process; then subjecting the water to a second nanofiltration process to produce processed water; and injecting the processed water into an underground formation. In some embodiments, the water is recycled by being produced with oil and/or gas from the formation and then separated, and then re-injected into the formation. In some embodiments, one or more of aromatics, chlorinated hydrocarbons, ethers, other hydrocarbons, carbon dioxide, carbon monoxide, or mixtures thereof are mixed with the processed water prior to being injected into the formation. In some embodiments, the processed water is heated prior to being injected into the formation. In some embodiments, another material is injected into the formation after the processed water was injected. In some embodiments, the another material is selected from the group consisting of air, produced water, salt water, sea water, fresh water, steam, carbon dioxide, and/or mixtures thereof. In some embodiments, the processed water is injected from 10 to 100 bars above the reservoir pressure. In some embodiments, the oil in the underground formation prior to water being injected has a viscosity from 0.1 cp to 10,000 cp. In some embodiments, the underground formation has a permeability from 5 to 0.0001 Darcy. In some embodiments, the input water has a total dissolved salts value of at least 15,000 parts per million, expressed as sodium chloride dissolved, prior to removing any ions from the water.

Those of skill in the art will appreciate that many modifications and variations are possible in terms of the disclosed embodiments, configurations, materials and methods without departing from their spirit and scope. Accordingly, the scope of the claims appended hereafter and their functional equivalents should not be limited by particular embodiments described and illustrated herein, as these are merely exemplary in nature.

What is claimed is:

1. A system comprising:
    a well drilled into an underground formation comprising hydrocarbons;
    a production facility at a topside of the well;
    a water production facility connected to the production facility;
    wherein the water production facility produces water by passing the water through a first and a second nanofiltration module, and then injects the water into the well wherein the underground formation is beneath a body of water and the production facility is floating on a body of water, and wherein the first nanofiltration module comprises a less selective nanofiltration membrane and the second nanofiltration module comprises a more selective nanofiltration membrane.

2. The system of claim 1, wherein the production facility is a floating production platform.

3. The system of claim 1, further comprising a water supply and a water pumping apparatus, adapted to pump water to the water production facility.

4. The system of claim 1, wherein the water production facility has an input water having a total dissolved salts value of at least 15,000 parts per million, expressed as sodium chloride dissolved.

5. The system of claim 1, further comprising subjecting a reject stream from at least one of the first and the second nanofiltration modules to a recycle step.

6. The system of claim 1, further comprising subjecting a reject stream from at least one of the first and the second nanofiltration modules to a third nanofiltration module.

7. The system of claim 1, wherein the first nanofiltration module comprises a sodium rejection rate at 25 bars from 30 to 50%.

8. The system of claim 1, wherein the second nanofiltration module comprises a sodium rejection rate at 25 bars from 70% to 98%.

9. A method of using a system according to claim 1 comprising:
subjecting input water to a first nanofiltration process;
then subjecting the water to a second nanofiltration process to produce processed water; and
injecting the processed water into an underground formation.

10. The method of claim 9, wherein the water is recycled by being produced with oil and/or gas from the formation and then separated, and then re-injected into the formation.

11. The method of claim 9, wherein one or more of aromatics, chlorinated hydrocarbons, ethers, other hydrocarbons, carbon dioxide, carbon monoxide, or mixtures thereof are mixed with the processed water prior to being injected into the formation.

12. The methods of claim 9, wherein the processed water is heated prior to being injected into the formation.

13. The method of claim 9, wherein another material is injected into the formation after the processed water was injected.

14. The method of claim 13, wherein the another material is selected from the group consisting of air, produced water, salt water, sea water, fresh water, steam, carbon dioxide, and/or mixtures thereof.

15. The method of claim 9, wherein the processed water is injected from 10 to 100 bars above the reservoir pressure.

16. The method of claim 9, wherein the oil in the underground formation prior to water being injected has a viscosity from 0.1 cp to 10,000 cp.

17. The method of claim 9, wherein the underground formation has a permeability from 5 to 0.0001 Darcy.

18. The method of claim 9, wherein the input water has a total dissolved salts value of at least 15,000 parts per million, expressed as sodium chloride dissolved, prior to removing any ions from the water.

19. A system comprising:
a first well drilled into an underground formation comprising hydrocarbons;
a production facility at a topside of a first well;
a water production facility connected to the production facility;
a second well drilled into the underground formation;
wherein the water production facility produces water by passing the water through a first and a second nanofiltration module, and injects the water into the second well and into the underground formation and wherein the underground formation is beneath a body of water and the production facility is floating on a body of water, and wherein the first nanofiltration module comprises a less selective nanofiltration membrane and the second nanofiltration module comprises a more selective nanofiltration membrane.

20. The system of claim 19, wherein the first well is a distance of 50 meters to 2000 meters from the second well.

* * * * *